United States Patent
Li

(10) Patent No.: US 6,591,362 B1
(45) Date of Patent: Jul. 8, 2003

(54) SYSTEM FOR PROTECTING BIOS FROM VIRUS BY VERIFIED SYSTEM MANAGEMENT INTERRUPT SIGNAL SOURCE

(75) Inventor: Yung Fu Li, Taipei (TW)

(73) Assignee: Inventech Corporation, Taipei (TW)

( * ) Notice: Subject to any disclaimer, the term of this patent is extended or adjusted under 35 U.S.C. 154(b) by 0 days.

(21) Appl. No.: 09/496,358

(22) Filed: Feb. 2, 2000

(51) Int. Cl.[7] .......................... G06F 15/177; G06F 9/24; G06F 12/14
(52) U.S. Cl. .............................. 713/1; 713/2; 713/100; 713/193
(58) Field of Search ................................ 713/1, 2, 193, 713/200, 100; 380/4, 9

(56) References Cited

U.S. PATENT DOCUMENTS

| | | | | |
|---|---|---|---|---|
| 5,022,077 A | * | 6/1991 | Bealkowski et al. | 380/4 |
| 5,410,699 A | * | 4/1995 | Bealkowski et al. | 713/2 |
| 5,511,184 A | * | 4/1996 | Lin | 710/261 |
| 5,537,540 A | * | 7/1996 | Miller et al. | 714/38 |
| 5,802,277 A | * | 9/1998 | Cowlard | 713/200 |
| 5,844,986 A | * | 12/1998 | Davis | 380/4 |
| 5,881,151 A | * | 3/1999 | Yamamoto | 380/9 |
| 6,009,524 A | * | 12/1999 | Olarig et al. | 713/200 |
| 6,026,016 A | * | 2/2000 | Gafken | 365/185.04 |
| 6,292,012 B1 | * | 9/2001 | Yeh et al. | 326/8 |
| 6,401,208 B2 | * | 6/2002 | Davis et al. | 713/193 |
| 6,408,387 B1 | * | 6/2002 | Wells | 713/1 |
| 6,510,521 B1 | * | 1/2003 | Albrecht et al. | 713/193 |

* cited by examiner

Primary Examiner—Thomas Lee
Assistant Examiner—Chun Cao
(74) Attorney, Agent, or Firm—Birch, Stewart, Kolasch & Birch, LLP

(57) ABSTRACT

This invention discloses a method for preventing BIOS from viruses. It mainly uses the necessary signal produced when flash memory is written to generate a system management interrupt (SMI). Therefore, when a writing action occurs to BIOS stored in a flash memory, an SMI handler routine of BIOS can avoid the invasion of viruses. First, the necessary signal obtained from the BIOS flash memory is sent to the input pins of an SMI event source on a computer chipset so that the chipset can generate a corresponding SMI# to the computer CPU. Thus, when CPU receives the SMI#, it will check whether the BIOS flash memory is being written through the SMI handler routine of BIOS. If it is verified to be the viruses invasion, then the writing action is forbidden.

10 Claims, 4 Drawing Sheets

SYSTEM FOR PROTECTING BIOS FROM VIRUS BY VERIFIED SYSTEM MANAGEMENT INTERRUPT SIGNAL SOURCE

BACKGROUND OF THE INVENTION

1. Field of Invention

The present invention relates to a method for computer firmware protection and, in particular, to a method for protecting the computer basic input/output system (BIOS) from viruses.

2. Description of Related Art

One of the most critical elements in the computer system is the firmware for booting, namely, BIOS. In general, it is stored in non-volatile memory. BIOS is an executable code, which enables CPU to perform tasks such as initialization, diagnostic, loading the operating system (OS) kernel from mass storage, and routine input/output (I/O) functions.

When the power is turned on, CPU will "boot up" by fetching the instruction code residing in the BIOS. Due to its inherent nature, the BIOS has two conflicting requirements: (1) BIOS has to be perfectly protected, otherwise the whole system can not be started once BIOS is modified or destroyed; and (2) BIOS should be able to be easily modified so that improved functions or debugged upgrade action can be added in.

Usually, BIOS is implemented in erasable programmable read-only memory (EPROM) because it can not be modified by electrical currents. One has to remove EPROM from the slot and expose it to the ultraviolet light for a long time if the stored contents are to be modified. Therefore, BIOS stored in EPROM can be prevented from viruses. On the other hand, BIOS stored in EPROM devices do not support "field upgrades" because these devices are not in-circuit programmable, which is a necessary characteristic for field upgrades. Recently, the computer system structure is continuously renewed. Whether BIOS can be upgraded in time becomes an important issue. So most of current BIOS firmware adopts flash memory. However, since the BIOS flash memory is easy to be modified, it can be vulnerable to viruses, which may cause serious problems. For a typical computer virus, its code executes a code sequence to modify the BIOS contents. Once BIOS is improperly modified, the infected program code would be distributed to other areas or the kernel of OS. Moreover, since BIOS is the first program to be executed after the computer is turned on, it is before the start of any system or network anti-virus software. This makes the detection and cleaning of BIOS viruses more difficult. In particular, this type of viruses can get away from the scan of anti-virus software so that the system can not detect its existence.

The current protection of BIOS can be classified into two categories. (1) Hardware protection: a jumper or general purpose I/O is used to control the 12V input signal $V_{cc}$ of flash memory to prevent the flash memory from being written. Though this has a good protection effect, yet the operation is inconvenient. The defect is that the prevention and reaction toward viruses are passive. (2) Software protection: the usual method uses software protection. For some flash memory that does not support the above hardware protection, the system will directly give a set of command toward the flash memory to screening viruses. Nevertheless, the defect is that this set of command is a standard defined by the flash memory, thus it can be easily disabled by the virus. For example, the virus CIH can disable this type of software protection.

SUMMARY OF THE INVENTION

In view of the foregoing, one object of the present invention is to provide a method for protecting BIOS from viruses, which utilizes the necessary signal produced when flash memory is written to generate a system management interrupt (SMI). Therefore, when a writing action occurs to BIOS stored in the flash memory, an SMI handler routine of BIOS can avoid the invasion of viruses.

Pursuant to the above object, the method for protecting BIOS from viruses of the present invention is achieved by connecting flash memory stored with BIOS and the input pins of the system management interrupt (SMI) event source of a chipset. The method includes the steps of: (a) requiring an interruption by an executing program writing to the flash memory; (b) performing relevant BIOS settings for a necessary signal WE# from the flash memory; (c) obtaining an SMI signal sent out from the chipset by a computer CPU; (d) checking the source of the SMI signal by an SMI handler routine of BIOS; (e) determining whether an SMI source caused by the executing program is the viruses invasion; and (f) protecting the flash memory from being written. Step (b), in particular, further includes the steps of: (b1) performing POST when BIOS is started; (b2) initializing SMI handler routine; (b3) performing relevant settings for the chipset so that the chipset will generate an SMI signal when the flash memory is written; (b4) setting I/O trap SMI functions to prevent viruses from disabling SMI; and (b5) loading the operating system (OS).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The computer virus mentioned in this specification is an executable code. Taking an infected operating system (OS) as an example, when the OS is started a writing action will occurs to the flash memory stored with BIOS so that BIOS is modified and the system can not start. If the virus invasion could not be detected in time, that is, if there is no virus warning that prompts the user to take corresponding actions, the virus would continue to damage other devices such as the hard drive or memory so that data stored in these memory units are modified or deleted.

Figure 1:
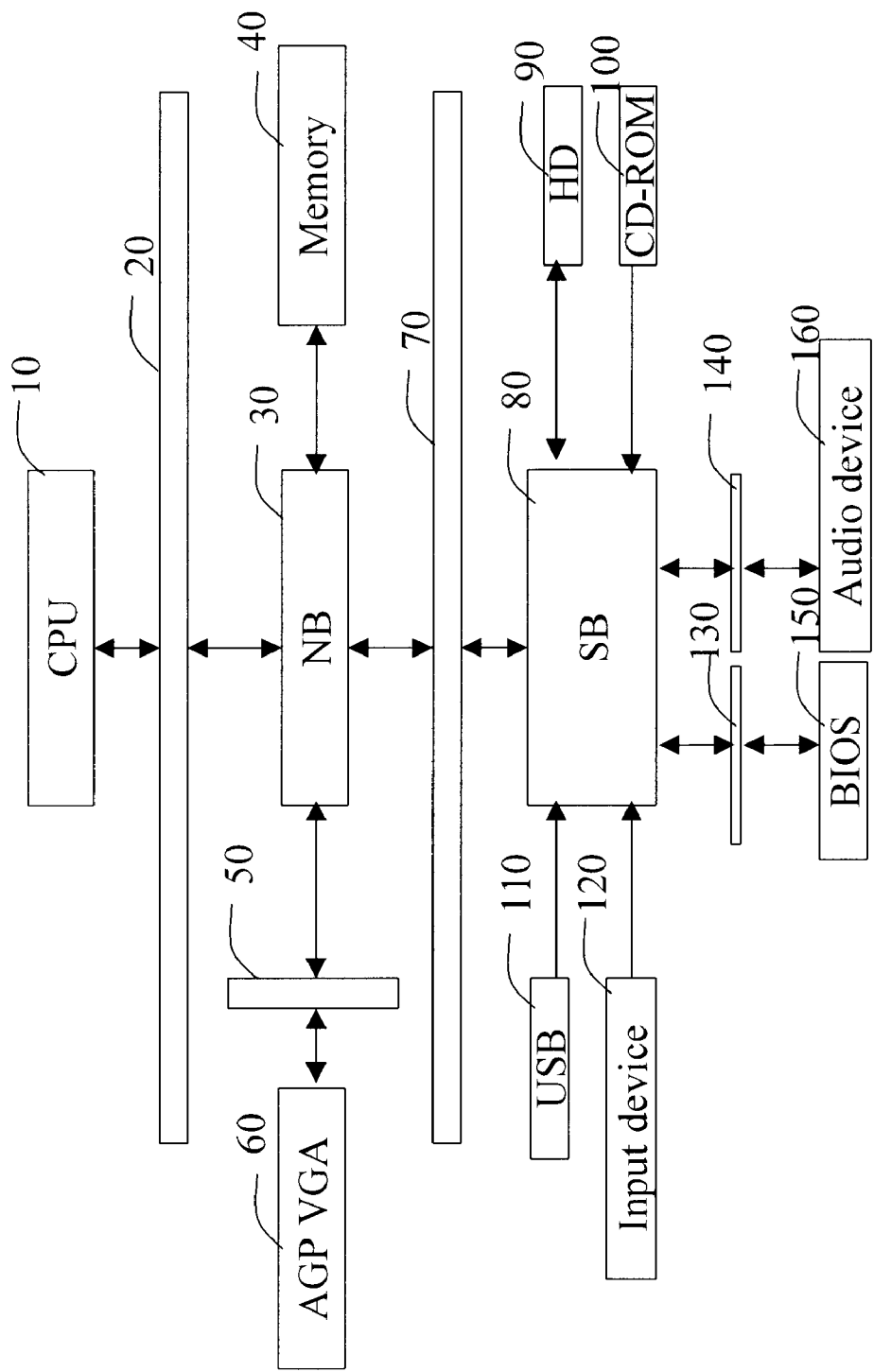
FIG. 1 depicts a schematic view of the hardware structure of a computer system according to the present invention.

Therefore, the instant invention provides a method for protecting BIOS flash memory from viruses. When there is a writing action on the BIOS flash memory, it is determined whether this writing action is abnormal. If it is determined to be a result of a virus, the computer will generate a virus warning and take immediate actions toward preventing the computer system from infected by the virus. The explicit implementation procedure is as follows:

Before going into detail, please first refer to FIG. 1, which depicts a schematic view of the hardware structure of a computer system according to the present invention, for a better understanding of the computer system structure. In currently widely used computer systems, a CPU 10 connects with a north bridge (NB) 30 through a CPU bus 20. Aside from connecting to memory (SDRAM or EDORAM) 40, the NB 30 further connects to an AGP VGA card 60 via an AGP bus 50. In addition, the NB 30 also connects to a south bridge (SB) 80 via a PCI bus 70 for transmitting data and messages. Aside from connecting to a hard drive (HDD) 90, a CD-ROM or DVD-ROM 100, a universal serial bus (USB) 110, an input device (such as the mouse and keyboard) 120 for accessing or inputting data, the SB 80 also connects to BIOS 150 and audio devices (such as the sound card) 160 via XD bus 130 and ISA bus 140, respectively. The NB 30 and SB 80 are control chipsets on the motherboard. The NB chip 30 near CPU 10 is also called the system main chip, while the SB chipset near the bus is the peripheral chip responsible for the peripheral devices.

Figure 2:
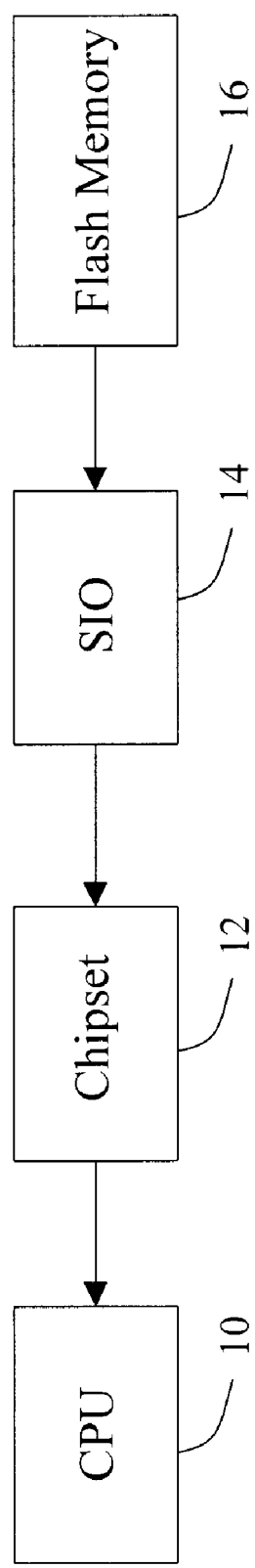
FIG. 2 shows a schematic view of the hardware configuration for the method for protecting BIOS from viruses according to the present invention.

How the computer system detects a writing action happening to the BIOS flash memory is first discussed. The method of this invention utilizes the necessary signal produced when the flash memory is written to generate an SMI to detect that a writing action occurs to the BIOS flash memory. This is done in both hardware settings and BIOS settings. Please refer to FIG. 2, which shows a schematic view of the hardware configuration connecting the BIOS flash memory and the SMI event source input pins of the chipset. In a preferred embodiment, the BIOS flash memory 16 connects via a connector 14 to a system chipset 12 connecting to CPU 10, such as the above-mentioned SB chip 30. In particular, the connector 14 can be achieved using a logic circuit or a super I/O (SIO) controller. The need for this connector 14 is that the chipset 12 need to receive many SMI causes while there are only finite SMI event source input pins on the chipset 12. Therefore, a better configuration is to utilize the integration and control of the connector 14 so that the chipset 12 can recognize the SMI causes of the BIOS flash memory 16. However, if the chipset 12 has a vacant pin, it can be directly connected to the BIOS flash memory 16 without the connector 14. This hardware setting is done in the layout of the motherboard. By the circuit design, the necessary signal, such as a WE# (write enable signal) output, sent out by the BIOS flash memory 16 can be transmitted to the chipset directly or via the connector 14 with a logic circuit or an SIO. The chipset 12 can then recognize the SMI cause and send out SMI# to CPU 10.

Figure 3:
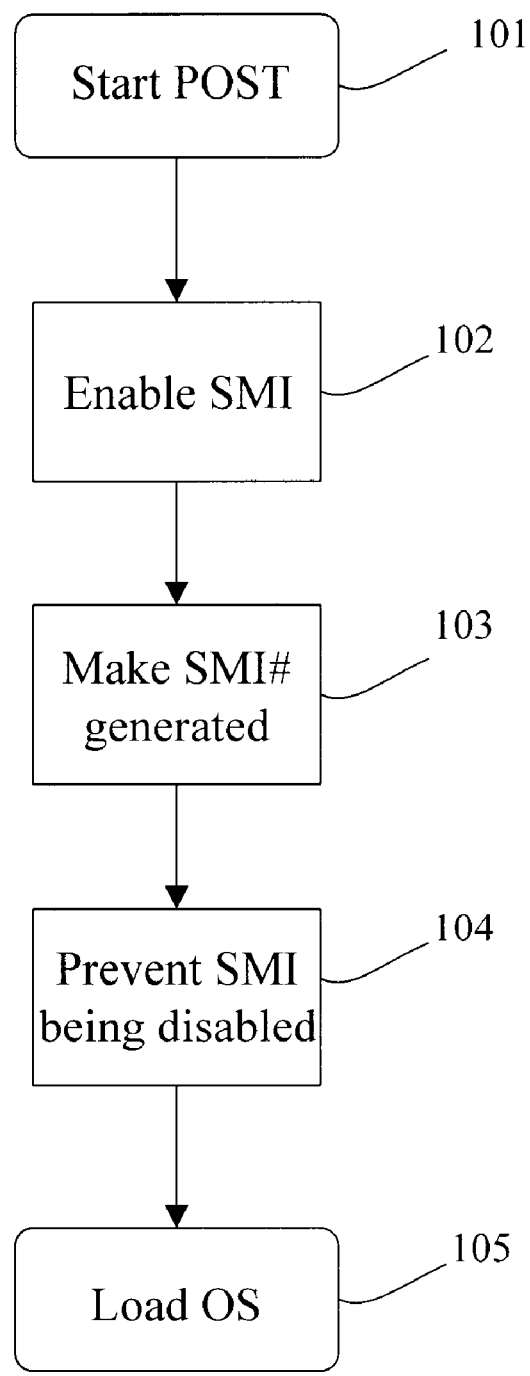
FIG. 3 shows a flow chart of the software settings of the method for protecting BIOS from viruses according to the present invention.

After completing hardware settings, one needs to modify the BIOS settings. Please refer to FIG. 3, which shows a flow chart of initializing BIOS when the BIOS executable code is modified. In usual computer systems, the function of generating SMI signals by BIOS flash memory is not turned on. That is, even one completes the above hardware settings, a corresponding modification on the BIOS executable code needs to be done so that the system can correctly recognize that the corresponding SMI# are caused by that fact that a writing action happens to the BIOS flash memory 16. First, as in step 101, the computer starts by booting. In the process of starting BIOS, a power-on self-test (POST) is first performed, including all tests to take sure the computer is functioning well and initialization of the registers in certain hardware devices. The BIOS executable code is often loaded into memory in the execution of POST. After POST starts, as in step 102, the function of generating SMI by the BIOS flash memory needs to be turned on to perform the procedure for initializing the SMI handler routine. Then BIOS performs relevant settings on the chipset 12 to comply with the input signals from the BIOS flash memory, the logic circuit, or the SIO in step 103. The I/O trap SMI function is set to prevent the virus from disabling the SMI function in step 104. Finally, as in step 105, the computer loads in an OS such as MS-DOS or Windows after POST completes its tasks.

Figure 4:
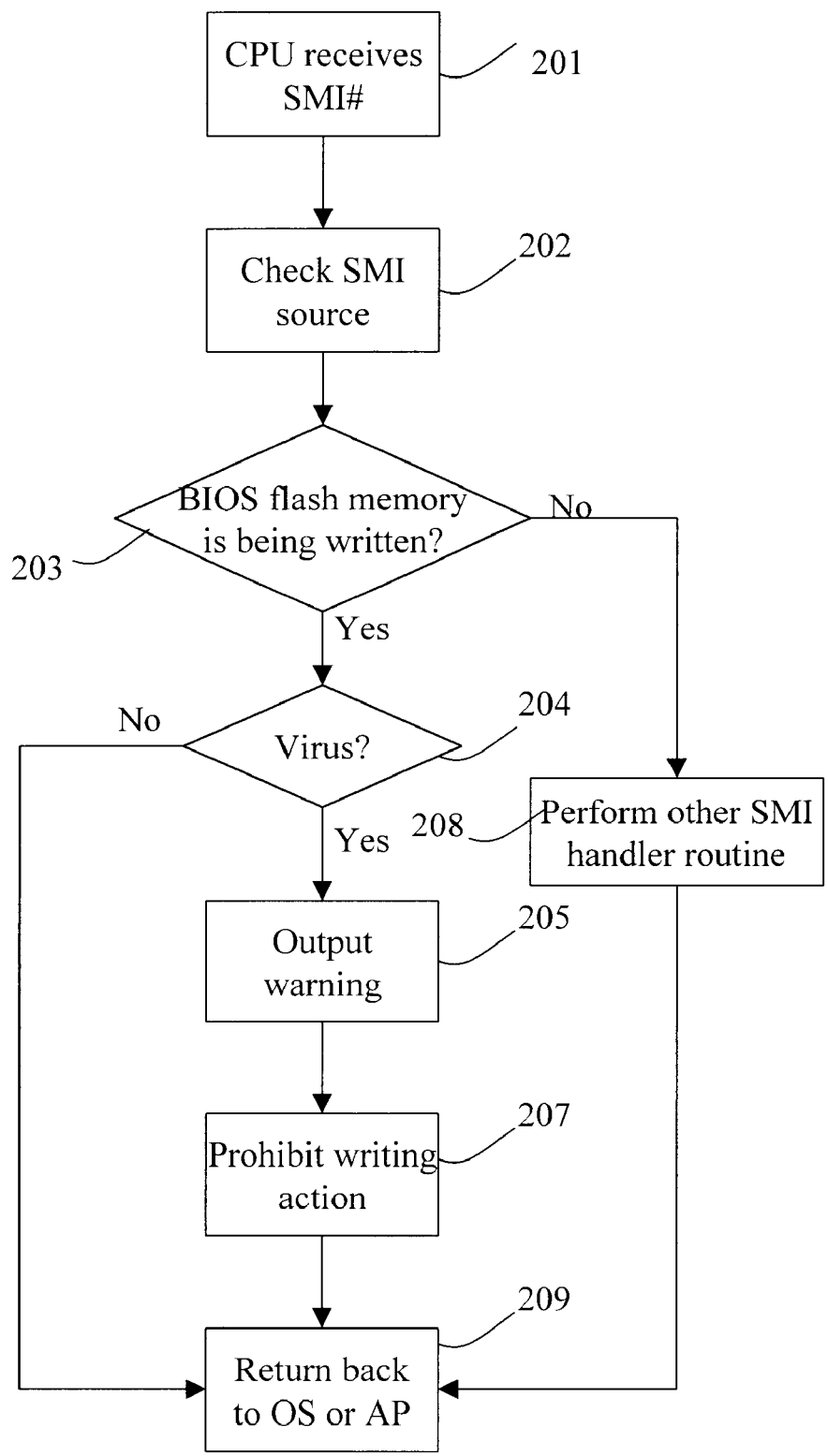
FIG. 4 is a procedure flow of implementing the method for protecting BIOS from viruses according to the present invention.

After completing both the hardware and software settings, please refer to the procedure flow in FIG. 4 for cleaning viruses according to the invention. When CPU 10 receives an SMI# (step 201), the system starts the SMI handler routine of BIOS to check the SMI cause (step 202). When it is determined that this SMI# is a result of a writing action happening to the BIOS flash memory (step 203), and the writing action is not done by BIOS or BIOS upgarde program, that is, it is an improper BIOS modification by a virus (step 204), the system will send out a warning (step 205) such as a beep or some special sound to inform the user that a virus is about to damage BIOS. The system will take relevant actions to prohibit the virus from writing. Furthermore, if it is determined that the SMI# is not a result of a writing action happening to the BIOS flash memory in step 203, the system will continue other SMI handler routine contents (step 208) and finally return to OS or an application program (AP) (step 209). If the writing on the BIOS flash memory is determined to be done by BIOS, BIOS code or other improper writing causes in step 204, the system will also return to OS or AP in step 209. As to step 207, different methods will be employed for different ways of prohibiting writing. The details are described hereinafter.

Three preferred embodiments of how to determine whether the SMI# of a writing action happening to the BIOS flash memory is caused by a virus program in step 204 are as follows:

(1) Before BIOS or BIOS upgarde writes to the BIOS flash memory, a specific value is written to a specific location in memory, i.e., setting a flash write flag, and is removed after the BIOS flash memory writing. Therefore, when the SMI handler routine of BIOS determines whether the SMI causes is that a writing action happens to the BIOS flash memory, it will first check whether the above flash write flag exists. If it does, then the writing is done by BIOS or the BIOS upgarde program; otherwise, it is determined to be virus damaging the BIOS flash memory.

(2) Before BIOS or the BIOS upgarde program writes to the BIOS flash memory, a BIOS service routine is always called to complete the process. The BIOS service routine must be stored in ROM with the addresses ranging from 000E0000h to 000FFFFF. When the SMI occurs and CPU enters a system management mode (SMM), the address of the executing program before interruption will be stored in SMRAM by the registers such as the code segment (CS) or the expanded instruction pointer (EIP). Thus, when a writing action happens to the BIOS flash memory and the SMI is generated, the SMI handler routine checks whether the address of the executing program before interruption is stored within the addresses from 000E0000h to 000FFFFF. If it is, then the writing is determined to be done by BIOS or the BIOS upgarde program; otherwise, it is done by viruses.

(3) Before BIOS or the BIOS upgarde program writes to the BIOS flash memory, the switch for generating the SMI# when a writing action happens to the BIOS flash memory is shut down. It is turned on after the writing is completed. Therefore, no SMI# would be generated in the writing process. Since the virus program does not know or cannot shut down the SMI# switch, when the SMI handler routine discovers that an SMI is generated as a writing action occurs to the BIOS flash memory, it is determined to be done by a virus.

As to the method for prohibiting viruses from writing in step 207, i.e., the method for processing virus damaging on the BIOS flash memory by the SMI handler routine, two preferred embodiments are described as follows:

(1) Use the system speaker to produce special beep to warn the user. CPU executes this beep program without interruption and does not leave the SMI handler routine so as to prevent from going back to the virus program and damaging the BIOS flash memory or other devices such as the hard drive. Since the system is idle at this moment, the user can look up the user's manual or consult the computer vendor according to the beep to find out that the computer is invaded by viruses.

(2) Use the SMI handler routine to write a specific value to a specific location in memory, i.e., setting a virus flag. Since a string of command codes have to be written into specific addresses before a writing action can happen to the BISO flash memory, the SMI handler routine can destroy the write command code in CPU register in SMRAM so that the write command is ineffective and cannot damage the BIOS flash memory. Therefore, this method eventually will perform step 208 and return to OS, a corresponding program is edited. This program is executed under the OS to periodically scan the virus flag in memory or to discover that a virus flag is produced. Then it will prompt a warning message on the monitor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for protecting BIOS from viruses through a connection between a flash memory stored with BIOS and system management interrupt (SMI) event source input pins of a chipset, which comprises the steps of:

requiring an interruption by an executing program writing to the flash memory;

performing relevant BIOS settings to comply with a necessary signal produced by the flash memory;

obtaining a SMI signal sent out from the chipset by a computer CPU;

checking a source of the SMI signal by an SMI handler routine of BIOS;

determining an SMI source caused by the executing program is a viruses invasion; and protecting the flash memory from being written, wherein the step of protecting the flash memory from being written further comprises the steps of:

writing a virus flag into the flash memory by the SMI handler routine;

destroying a written command code strings of the executing program written to an address by the SMI handler routine so as to make the written command ineffective;

returning to an operating system (OS); and checking whether the virus flag exists in the flash memory and displaying a warning message.

2. The method for protecting BIOS from viruses of claim 1, wherein the necessary signal is a WE# (write enable signal).

3. The method for protecting BIOS from viruses of claim 1, wherein the step of performing relevant BIOS settings further comprises the steps of:

executing a power-on self-test (POST);

initializing the SMI handler routine;

performing relevant settings for the chipset so that the chipset can generate the SMI signal when a writing action occurs to the flash memory;

setting an I/O trap SMI function to prevent the viruses invasion from disabling the SMI; and loading in an operating system (OS).

4. The method for protecting BIOS from viruses of claim 1, wherein the step of determining the SMI source caused by the executing program is the viruses invasion further comprises the steps of:

setting to write a flash write flag into memory before an authorized program writes to the flash memory; and checking the flash write flag not existing in the flash memory by the SMI handler routine.

5. The method for protecting BIOS from viruses of claim 4, wherein the authorized program includes BIOS and a BIOS upgrade program.

6. The method for protecting BIOS from viruses of claim 1, wherein the step of determining the SMI source caused by the executing program is the viruses invasion further comprises the steps of:

setting to call a BIOS service routine when an authorized program writes to the flash memory; and checking the address of the executing program before the interruption is not between 000E0000h and 000FFFFF by the SMI handler routine.

7. The method for protecting BIOS from viruses of claim 6, wherein the authorized program includes BIOS and a BIOS upgrade program.

8. A method for protecting BIOS from viruses of claim 1, wherein the step of determining the SMI source caused by the executing program is the viruses invasion further comprises the steps of:

disabling generation of the SMI signal when an authorized program writes to the flash memory; and checking whether the SMI source is caused by the executing program.

9. The method for protecting BIOS from viruses of claim 8, wherein the authorized program includes BIOS and a BIOS upgrade program.

10. The method for protecting BIOS from viruses of claim 1, wherein the step of protecting the flash memory from being written further comprises the steps of:

generating a warning beep; and making the system stay in the SMI handler routine.

* * * * *

UNITED STATES PATENT AND TRADEMARK OFFICE
CERTIFICATE OF CORRECTION

PATENT NO. : 6,591,362 B1  Page 1 of 1
APPLICATION NO. : 09/496358
DATED : July 8, 2003
INVENTOR(S) : Yung-Fu Li It is certified that error appears in the above-identified patent and that said Letters Patent is hereby corrected as shown below:

ON THE COVER PAGE:

Please amend the name of the Assignee at Section "(73)" as follows:

Change "(73) Assignee: Inventech Corporation, Taipei (TW)" to read -- (73) Assignee: Inventec Corporation, Taipei (TW) --.

Signed and Sealed this

Twenty-fifth Day of March, 2008

JON W. DUDAS
*Director of the United States Patent and Trademark Office*